United States Patent [19]

Wilkinson

[11] 4,417,428

[45] Nov. 29, 1983

[54] INTEGRAL PURGED MULTI-LAYER INSULATION DESIGN

[75] Inventor: Calvin L. Wilkinson, Renton, Wash.

[73] Assignee: Boeing Aerospace Company, Seattle, Wash.

[21] Appl. No.: 235,853

[22] Filed: Feb. 19, 1981

[51] Int. Cl.³ .............................................. E04B 1/74
[52] U.S. Cl. ....................................... 52/172; 52/304; 52/404; 220/420; 220/424
[58] Field of Search ..................... 52/173 R, 171, 172, 52/404, 304; 220/421, 422, 423, 424, 425, 426, 420; 62/385, DIG. 13; 98/40 C, 40 R, 465

[56] References Cited

U.S. PATENT DOCUMENTS

| | | |
|---|---|---|
| 2,513,749 | 7/1950 | Schilling .......................... 220/420 |
| 2,540,331 | 2/1951 | Hlavaty . |
| 2,676,773 | 4/1954 | Sanz et al. . |
| 2,811,850 | 11/1957 | Clary .................................. 98/40 C |
| 3,012,407 | 12/1961 | Burrows . |
| 3,024,941 | 3/1962 | Vandenberg . |
| 3,135,420 | 6/1964 | Farell et al. . |
| 3,149,742 | 9/1964 | Hay et al. . |
| 3,159,005 | 12/1964 | Reed et al. . |
| 3,169,379 | 2/1965 | Black . |
| 3,304,728 | 2/1967 | De Haan . |
| 3,349,574 | 10/1967 | Glaser . |
| 3,365,897 | 1/1968 | Middleton et al. . |
| 3,409,061 | 5/1968 | Struble, Jr. . |
| 3,415,408 | 12/1968 | Seitz . |
| 3,724,228 | 4/1973 | Sollami et al. . |
| 3,834,096 | 9/1974 | Becker ................................ 52/172 |
| 4,009,236 | 2/1977 | Katsuta .............................. 62/45 |
| 4,050,608 | 9/1977 | Smith ................................. 52/465 |
| 4,055,268 | 10/1977 | Barthel ............................. 220/424 |
| 4,316,406 | 2/1982 | Lind ................................... 98/40 R |

Primary Examiner—John E. Murtagh
Assistant Examiner—Richard E. Chilcot, Jr.
Attorney, Agent, or Firm—Finnegan, Henderson, Farabow, Garrett & Dunner

[57] ABSTRACT

Segments of multi-layer insulation have their ends bent outwardly and abutting the outwardly bent ends of adjacent segments. A purge gas flows through the spaces in the multi-layer insulation segments, the purge gas entering the spaces by way of some of the segment ends from gas inlet channels formed by extending the outer layers of segments past some of the segment ends and joining the extended outer layers to the outer layers of adjacent segments.

22 Claims, 8 Drawing Figures

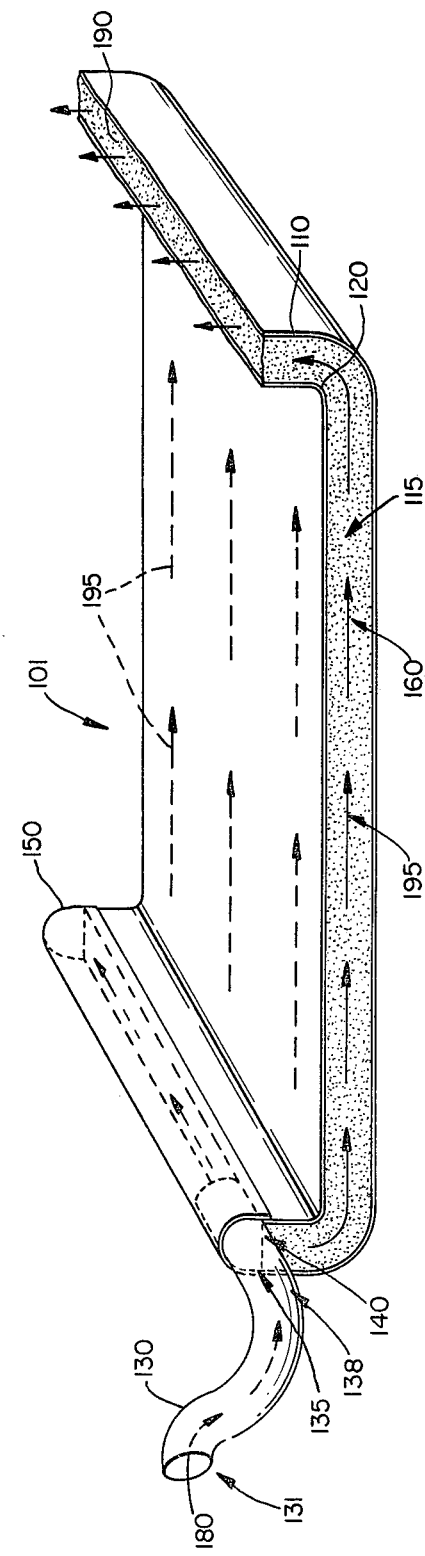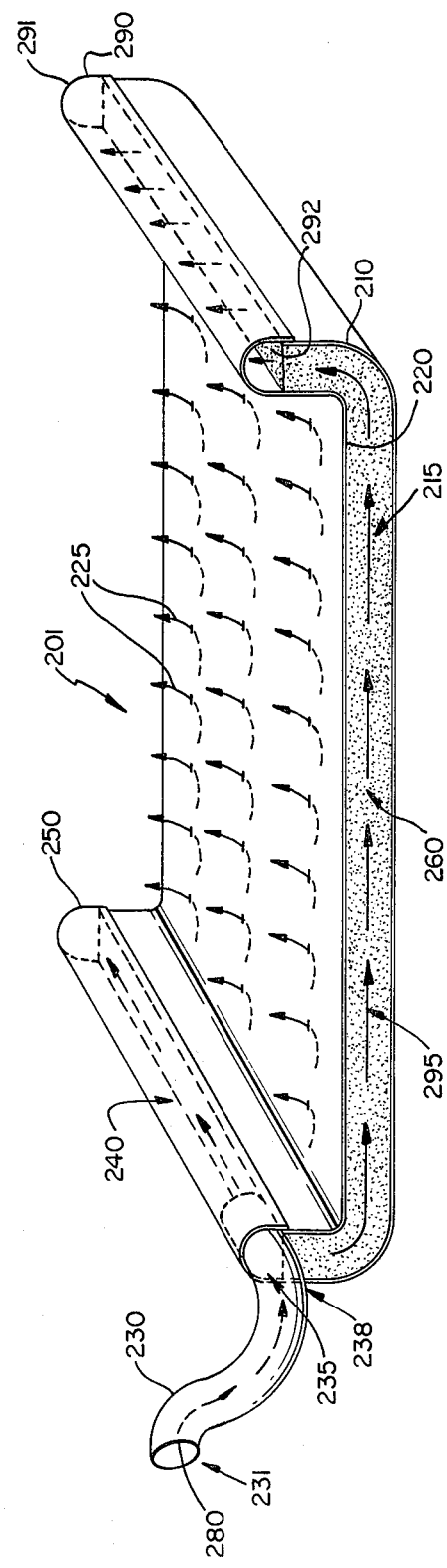

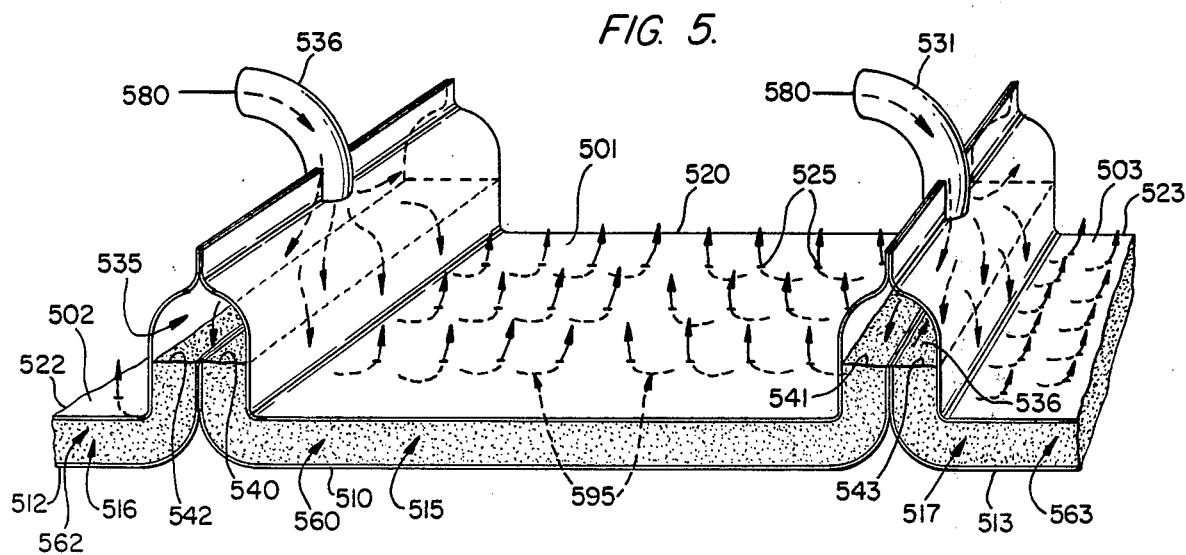
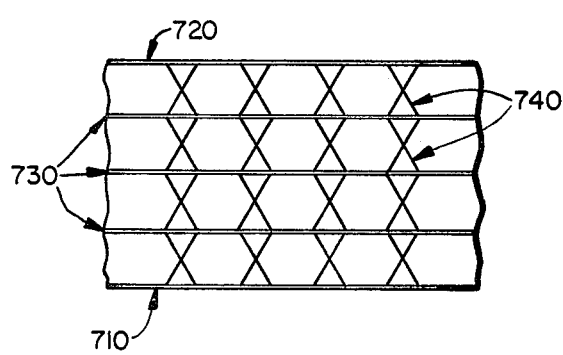
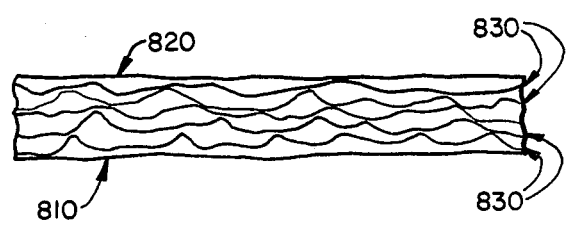

INTEGRAL PURGED MULTI-LAYER INSULATION DESIGN

BACKGROUND OF THE INVENTION

This invention relates to the field of thermal insulation and, more particularly, to the field of purged multi-layer insulation systems.

The Space Shuttle promises to propel space travel and exploration to new reaches. For the first time in the short history of space exploration, a launch vehicle offers a large cargo bay for a wide variety of payloads and can, after orbiting the earth, return to the surface with or without its payload, land on a runway, be refitted with a new payload and be relaunched. The Shuttle is most certainly only the first of a long line of vehicles that will provide unparalleled opportunities for examining the stars, the earth and the universe. Other vehicles which offer even more capability than the Space Shuttle are on the drawing boards.

Before these opportunities can be provided, and the capabilities of these new vehicles realized, many technological limitations presently part of the spacecraft design art must be overcome. Spacecraft design has always demanded innovative solutions to its unique problems, and, true to form, the advent of the Shuttle, and the promise of future launch vehicle developments, demands new and improved solutions for their unique design problems.

This invention involves a class of design problems, thermal insulation, and in particular, thermal insulation for vessels filled with cryogenic liquid propellants. The requirements for thermal insulation of cryogenic liquid propellant tanks are especially rigorous because of the environmental extremes under which it must operate. Liquid hydrogen and liquid oxygen, for example, boil at $-252.8°$ C. and $-182.9°$ C., respectively, a pressure of at one atmosphere. The design of such insulation systems flown with recoverable vehicles such as the Shuttle is made all the more difficult because the insulation system must perform effectively in space and not suffer degradation on the ground before launch or during the atmospheric re-entry process.

NASA requires the thermal insulation for all Shuttle payloads to be exceedingly safe. The safety requirements are especially severe for insulation on tanks of propellants whose surfaces fall below the liquefaction temperature of air. The dangers of this liquefaction of air (comprised primarily of oxygen and nitrogen) are explained below in greater detail.

The design of thermal insulation for Shuttle payloads is further complicated, and perhaps most severely tested, by the dictates of economy. Lower cost is the raison d'etre of the Space Shuttle program and will probably dictate the design of all future launch vehicles. Lower cost is the impetus behind the concept of a reusable launch vehicle and lower cost is the principal reason that the Shuttle is planned to replace the bulk of the conventional launch vehicles, which, in turn, is why the Shuttle is being designed to provide such a broad range of payload services.

In keeping with this philosophy, payloads carried by the Shuttle are encouraged to minimize costs. As an example, one of the payloads envisioned for future Shuttle flight, the Orbital Transfer Vehicle (OTV), exemplifies the low-cost concept and will be discussed in detail. After the Shuttle has attained low earth orbit, the OTV, acting as last stage of a booster rocket, will transfer a spacecraft out of the low orbit to a higher earth orbit, for example, a geosynchronous orbit for weather satellites, or on a trajectory out of the earth's gravitational influence. After releasing the spacecraft, the OTV has the capability to rendezvous either with the Shuttle vehicle from which it left or with another Shuttle vehicle and then be returned by the rendezvous vehicle to earth for reuse.

The thermal insulation for the OTV liquid propellant tanks, which are planned to contain liquid hydrogen and liquid oxygen, must be relatively inexpensive since the Orbiter Transfer Vehicle itself is designed to be low-cost. The low cost of the insulation, however, cannot be a reason for compromising the thermal insulation design requirements mentioned earlier: safety and efficacy on the ground and in space.

Cost has four aspects with regard to Shuttle payloads: weight, space, DDT&E (design, development, testing and evaluation), and the expenses of construction and operation. The first two directly affect Shuttle costs since the Shuttle is weight- and volume-limited. Weight allocated to insulation, for example, cannot be used for additional scientific equipment. Likewise, volume used by insulation cannot be used for other purposes.

DDT&E and construction expenses are one-time expenditures that add to the overall space program costs. Operating expenses, however, will add to the expenses incurred each time the payload is used. Operating expenses include not only what must be spent to use the payloads, but they also include what must be spent to repair the damage to the payload or to its subsystems from earlier flights.

One type of thermal insulation which is used for vehicles in space is multi-layer insulation. Multi-layer insulation is constructed of separate layers of thin, highly reflective sheets that minimize radiation heat transfer.

When multi-layer insulation is used to protect vessels containing cryogenic liquids, however, severe problems can arise during ground operations. The boiling point of hydrogen, for example, is so low that most gases, particularly those comprising the atmosphere, will liquefy on contact with a container of liquid hydrogen. If that container of liquid hydrogen is surrounded only by multi-layer insulation, atmospheric gases can reach the container through the spaces between the layers of insulation. One atmospheric gas, oxygen, liquefies at $-182.9°$ C. Liquid oxygen readily supports combustion of almost any material and is hypergolic with many materials. Nitrogen, the other primary constituent of the atmosphere, liquefies at $-209.9°$ C. The problem resulting from liquefied gases in the layers of insulation is that those liquefied gases tend to accumulate in low points in the insulation and, when exposed to the decreasing atmospheric pressure during launch, will return to the gaseous state and expand in a sufficiently sudden and forceful manner as to damage the insulation severely.

Another problem that arises when using multi-layer insulation on any surface whose temperature falls below the dew point of the surrounding atmosphere is that water will accumulate in the insulation. If the temperature is below 0° C. this water will freeze and if the temperature is above 0° C. it will remain liquid. In either case, during ascent of the launch vehicle, falling atmospheric pressure causes the water (or ice) to boil (or sublimate) suddenly and release, explosively, water vapor that has accumulated over a long period with resultant insulation damage.

There are two techniques for preventing the accumulation of these liquids (and solids) in multi-layer insulation. One technique is vacuum jacketing. In this technique, the insulation is contained within a jacket made up of the tank on the inside and an outer shell capable of withstanding the crushing pressure of the atmosphere when a vacuum is created on the jacket interior. This technique is commonly used for ground based cryogenic tanks, but it is too heavy to be practical for most space applications.

The other technique to protect the multi-layer insulation and to prevent the condensation of ambient gases is to purge the multi-layer insulation with an inert gas whose boiling point is lower than the temperature at the outer surfaces on the cryogenic vessel. In the case of a vessel containing liquid hydrogen, the only readily available purge gas that will work is helium, whose boiling point is −268.9° C. Liquid oxygen tanks may be purged with nitrogen. This multi-layer insulation purging system must operate while the cryogenic vessel is on the ground and perhaps even during the eary phases of launch.

SUMMARY OF THE INVENTION

The present invention meets all the objects for a thermal insulation system for Shuttle payloads, safety, efficacy and economy, by a unique design for purging a multi-layer insulation system which uses a minimal amount of equipment in addition to the multi-layer insulation itself. The insulation system of the present invention adds almost no additional weight or space to the payload and it costs relatively little to make and operate. In addition, the insulation system of the present invention is easily fabricated and its dimensions are not highly critical.

Additional objects and advantages of the invention will appear in the following description, and other objects and advantages will be obvious from that description. The stated objects and advantages of the invention may be realized by the apparatus and methods particularly pointed out in the appended claims.

To achieve the objects and purpose of the invention, the insulation system of this invention comprises a segment of multi-layer insulation having at least a side and at least two ends and also having at least an inner layer and an outer layer, the layers being separated by a space, gas inlet means for introducing a purge gas into one of the ends of the segment, and gas outlet means for establishing flow paths for the purge gas throughout substantially all of the space in the segment.

Alternatively, the insulation system of this invention comprises a plurality of adjacent segments of multi-layer insulation, each segment having at least a side and at least two ends, and also having at least an inner layer and an outer layer, the inner and outer layers of each of the segments being separated by a space, gas inlet means for introducing a purge gas into a first number of the ends of the segments, and gas outlet means for establishing flow paths for the purge gas throughout substantially all of the spaces in all of the segments.

The method of insulating of this invention includes the steps of entering purge gas into the space between the inner layer and the outer layer of a segment of multi-layer insulation at the end of the segment, and forcing the purge gas to flow through substantially all of the space.

Alternatively, the method of insulating of this invention includes the steps of joining a plurality of adjacent segments of multi-layer insulation having at least a side and at least two ends, entering a purge gas into the spaces between the inner layers and outer layers of the multi-layer segments at a first number of ends of the segments, and forcing the purge gas to flow through substantially all of the spaces in all of the segments.

The accompanying drawings, which are incorporated in and constitute a part of this specification, illustrate one embodiment of the invention and, together with the description, explain the principles of the invention.

BRIEF DESCRIPTION OF THE DRAWINGS

FIG. 1 is a perspective view of a segment of multi-layer insulation of the present invention.

FIG. 2 is a perspective view of another segment of multi-layer insulation of the present invention embodying an outlet means different from the one in FIG. 1.

FIG. 5 shows a perspective view of adjacent segments of multi-layer insulation embodying an outlet means different from the one in FIG. 3.

FIG. 7 is a schematic view of one type of multi-layer insulation.

FIG. 8 is a schematic view of a different type of multi-layer insulation.

DESCRIPTION OF THE PREFERRED EMBODIMENT

Figure 3:
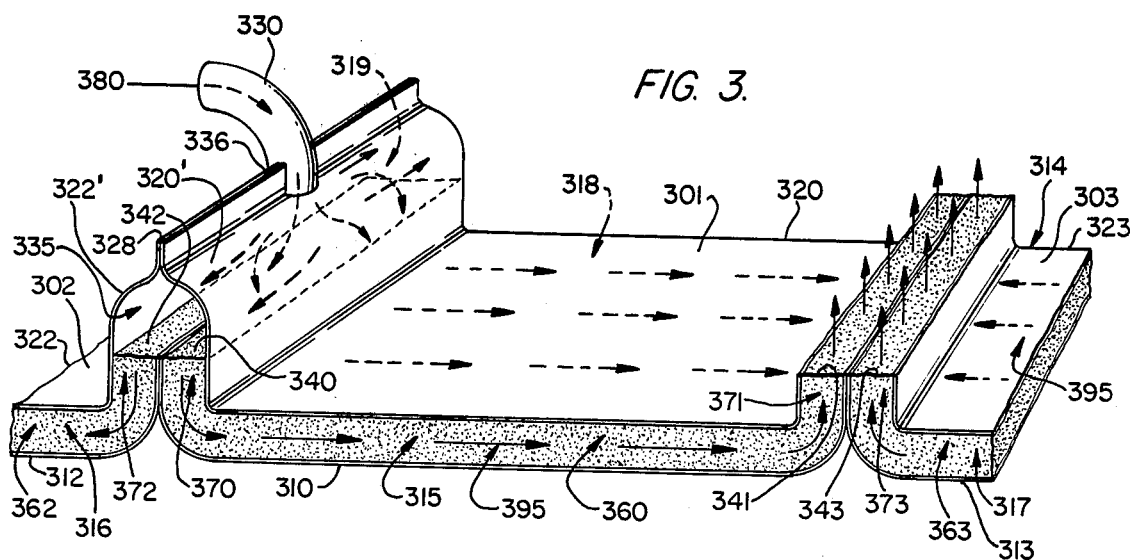
FIG. 3 is a perspective view of adjacent segments of multi-layer insulation organized in accordance with the present invention.

Reference will now be made in detail to the present preferred embodiments of the invention, examples of which are illustrated in the accompanying drawings.

A preferred embodiment of the insulation system is shown in FIG. 1. A rectangular segment of multi-layer insulation 101 has a side 115 and ends 140 and 190. The inner layer 110 of segment 101, preferably the layer closest to the vessel being insulated, is separated from the segment's outer layer 120 by space 160. Typically, multi-layer insulation segment 101 would include many layers of thin, reflective sheets between the inner and outer layers, and typical segments of insulation will be discussed below. With regard to the segment of multi-layer insulation in FIG. 1, however, only the inner layer 110 and the outer layer 120 will be discussed.

In accordance with the invention, the insulation system also comprises gas inlet means for introducing a purge gas into one of the ends of the segment 101. In the embodiment illustrated in FIG. 1, purge gas 180 is entered into segment end 140.

In this embodiment, the gas inlet means includes a gas inlet channel 135 covering the entire exposed surface of end 140. Gas inlet channel 135 is used to introduce purge gas 180 through segment end 140 and into space 160.

The top of inlet channel 135 is formed by extending segment outer layer 120 past segment end 140 to form outer layer extension 122, then folding outer layer extension 122 over the exposed surface of end 140, and finally, joining outer layer extension 122 to segment inner layer 110 by a gas-tight connection at point 138. Gas inlet channel 135 is thus bound by the surface of end 140 and the outer layer extension 122.

Flexible duct 130 connects to one end of gas inlet channel 135. Preferably, the gas inlet channel end 150, which is the end not connected to flexible duct 130, is sealed to prevent the purge gas in gas inlet channel 135 from leaking out of end 150.

A source of purge gas (not shown) is connected to flexible duct 130 at duct opening 131 so that purge gas 180 flows through flexible duct 130, then into channel 135, and finally, into space 160 of segment 101.

In accordance with the invention, the insulation system also comprises gas outlet means for establishing flow paths for the purge gas 180 throughout substantially all the space in segment 101. In FIG. 1, purge gas 180 exits space 160 via the exposed surface of segment end 190. Side 115 and the side opposite to side 115 (not shown in FIG. 1) are sealed to prevent the purge gas from flowing through the sides of segment 101. Thus, in the preferred embodiment, the purge gas which entered space 160 from end 140 can only exit space 160 from end 190. Because gas inlet channel 135 and exposed end 190 are on opposite sides of segment 101, and because channel 135 and end 190 extend the full width of rectangular segment 101, flow paths 195 of the purge gas 180 are established throughout substantially all of space 160.

FIG. 2 illustrates an alternate embodiment of the segment of this invention. This embodiment of the segment of multi-layer insulation provides different flow paths through its space.

A segment of multi-layer insulation 201 has ends 290 and 240 and side 215. Inner layer 210 of segment 201 is separated from segment outer layer 220 by space 260.

Purge gas 280 is fed from a source of purge gas (not shown) into flexible duct 230 at opening 231. Duct 230 is connected to one end of gas inlet channel 235 covering segment end 240. Purge gas 280 from the purge gas source will thus flow through duct 230 and inlet channel 235 and into space 260 via segment end 240.

Gas inlet channel 235 is formed above the surface of end 240 by extending outer layer 220 to form outer layer extension 222, then folding outer layer extension 222 over end 240, and finally, joining extension 222 to inner layer 210 by a gas-tight connection at point 238. Preferably, gas inlet channel end 250, which is opposite the channel end connected to duct 230, is sealed to prevent the leakage of purge gas at end 250.

In this embodiment, the surface of segment end 290 is not exposed, but instead, the outer layer 220 is extended over end 290 to form outer layer extension 223. Outer layer extension 223 is joined to segment inner layer 210 at point 239 by a gas-tight connection and is sealed at points 291 and 292 to prevent any purge gas from leaking out segment end 290.

The outer layer 220 of segment 201 contains perforations 225. Perforations 225 are arranged in outer layer 220 to ensure that flow paths 295 of purge gas 280 exist throughout substantially all of space 260.

If there were additional layers of the multi-layer insulation between inner layer 210 and outer layer 220, then each layer of segment 201 except inner layer 210 would be perforated randomly, such that the perforations would be misaligned, to ensure that purge gas flow paths 295 would extend throughout substantially all of the space multi-layer insulation segment 201.

In FIG. 2, it is clear that segment end 290 need not be sealed for the insulation system of this invention. Even with perforations 225, segment end 290 may be exposed as long as the purge gas flows throughout substantially all of the space in the segment.

This invention embodies the concept of minimum cost. In both FIGS. 1 and 2, the only equipment needed in addition to the segment of multi-layer insulation is the flexible duct and the source of purge gas. The weight and space penalties for this additional hardware are minimal for a purged system since all conventional purged, multi-layer insulation systems use both a source of purge gas and some sort of ducting from that purge gas source. The construction and operating costs for this system are also minimized because the insulation system of the present invention has few elements and the system's operation is not complicated. Stated simply, there are very few points where this system can fail, and this reduces the costs for quality assurance, training of repair personnel, and pre-launch fitness tests.

The insulation purge system of the present invention operates safely and effectively on the ground and the multi-layer insulation efficiency is not compromised in orbit. The efficacy of multi-layer insulation in the space environment is proven by its widespread use. The insulation system of this invention operates satisfactorily on the ground also by purging the undesired gases from substantially all of the space in the insulation segment to prevent the effects of unwanted liquefaction of ambient gases. The segment of multi-layer insulation can withstand both the vacuum of space and the one atmosphere crushing pressure on the earth's surface after a return from space.

The insulation system of the present invention achieves all of its stated objects and offers all of its stated advantages by a design free from unnecessary and costly subsystems. This insulation system is consistent with the standards and the requirements of the Space Shuttle system and represents the type of innovation characteristic of the U.S. space program. The insulation systems of this invention are not limited to the Orbiter Transfer Vehicle (OTV) or even to Shuttle payloads, but this invention can provide thermal insulation for many space flight and non-space flight applications, and provide that insulation safely, effectively and economically.

It has been explained that the present invention uses segments of multi-layer insulation. FIGS. 7 and 8 illustrate two different types of that insulation. In both types, the layers of insulation are thin, highly reflective sheets.

In FIG. 7, between inner layer 710 and outer layer 720 lie several intermediate layers of insulation 730. The layers 710, 720, and 730 are spaced from each other by separators 740, which are constructed to permit the transverse flow of purge gas between the layers of insulation.

FIG. 8 shows a different type of multi-layer insulation having layers of insulation 830 between inner layer 810 and outer layer 820. Each of the sheets making up the layers is crinkled or embossed and all the layers are positioned to permit purge gas to flow between them.

In most cases, when this system of multi-layer insulation is used, more than one segment of insulation will be required, especially when the insulation is used to cover a cryogenic vessel. FIG. 3 shows an embodiment of the system of this invention comprising adjacent segments of multi-layer insulation. In addition to the advantages provided by the invention as embodied in FIGS. 1 and 2, the system embodied in FIG. 3 provides the added benefit of not requiring the dimensions of the insulation segments to be highly critical.

In this embodiment, a plurality of adjacent, substantially rectangular segments of multi-layer insulation, 301, 302, and 303, each has at least a side, 315, 316, and 317, respectively, and at least two ends. Insulation segment 301 has ends 340 and 341. Only segment end 342 of segment 302 and segment end 343 of segment 303 are shown in FIG. 3. The segments 301, 302, and 303 each has an inner layer, 310, 312, and 313, respectively, and an outer layer, 320, 322, and 323, respectively. The inner layers and outer layers of segments 301, 302, and 303 are separated by spaces 360, 362, and 363, respectively.

In accordance with the invention, the insulation system comprises gas inlet means for introducing a purge gas into a first number of the ends of the segments. In the embodiment in FIG. 3, purge gas is introduced into ends 340 and 342.

The portion of segment 301 at end 340 and the portion of segment 302 at end 342 are bent outwardly to form bent end portions 370 and 372. Bent end portions 370 and 372 abut to form a pair of abutting bent end portions. The bending of end portions 370 and 372 exposes the surfaces of ends 340 and 342, and gas inlet channel 335 encloses these exposed end surfaces.

In the insulation system illustrated in FIG. 3, near bent end portions 370 and 372, the outer layers 320 and 322 of segments 301 and 302 are extended beyond ends 340 and 342 to form outer layer extensions 320′ and 322′, respectively. Outer layer extensions 320′ and 322′ are joined at point 328 at the top of gas inlet channel 335. Both ends of channel 335 are sealed to prevent the leakage of purge gas out of the ends.

Flexible duct 330 is connected to gas inlet channel 335 at point 336 substantially midway between the ends of channel 335. Purge gas 380 from a source of purge gas (not shown) passes through flexible duct 330 and into gas inlet channel 335. From inlet channel 335, purge gas 380 flows, via segment ends 340 and 342, into spaces 360 and 362 of segments 301 and 302, respectively.

Figure 4:
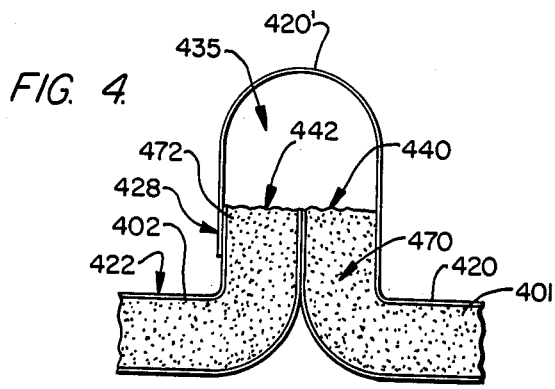
FIG. 4 is an alternate approach for forming the inlet channels of the segments of insulation.

FIG. 4 illustrates a different gas inlet channel according to the present invention. At abutting bent end portions 470 and 472, gas inlet channel 435 encloses the exposed surfaces of ends 440 and 442 of adjacent segments 401 and 402, respectively. The outer layer 420 of segment 401 extends beyond segment end 440 to form outer layer extension 420′. Outer layer extension 420′ wraps around gas inlet channel 435, and joins with outer layer 442 of segment 402 at point 428.

There is no requirement that the exposed surfaces of segment ends 340 and 342, or of segment ends 440 and 442, be coplanar. If one of the segments is cut a little too short or a little too long, then in a pair of abutting bent end portions, the bent end portion of one segment will be taller or shorter than the other bent end portion. The proper operation of the insulation system is not affected as long as the purge gas in the gas inlet channel can pass through the exposed end surfaces.

This dimensional noncriticality is rare if not unique in thermal insulation systems. Such systems usually require that the insulation blankets be carefully measured, which takes time and occasionally involves special equipment. If a blanket is miscut, even by a small amount, that blanket cannot be used and a new piece must be formed. The lack of a need for such dimensional precision in this invention not only allows the segments of insulation to be easily adapted to differently-shaped subsystems, but also means that less time must be spent on cutting the segments of insulation for this system and fewer mismeasured segments need be discarded and recut.

In accordance with the invention, the insulation system of this invention also comprises gas outlet means for establishing flow paths for the purge gas throughout substantially all the spaces in all of the segments. In the embodiment shown in FIG. 3, the outlet means includes the portions of segments 301 and 303 near ends 341 and 343 which are bent outwardly to form bent end portions 371 and 373, respectively. These bent end portions abut to form a pair of abutting bent end portions. The surfaces of these exposed ends, like the surfaces of ends 340 and 342, do not need to be coplaner. Here too, the dimensions of the segments of this invention can be non-critical.

Sides 315 and 318 of segment 301, sides 316 and 319 of segment 302, and sides 317 and 314 of segment 303 are all sealed or attached to adjacent identical segments to prevent purge gas 380 from flowing through the sides. The purge gas in segments 301 and 303 can only escape from spaces 360 and 362 through ends 341 and 343, respectively. Flow paths 395 for purge gas 380 are thus established throughout substantially all of the space in the segments.

FIG. 5 shows another type outlet means for this invention. Segments 501, 502, and 503 have inner layers 510, 512, and 513, respectively, and outer layers 520, 522, and 523, respectively. Segments 501, 502, and 503 contain, between their inner and outer layers, spaces 560, 562, and 563, respectively.

Gas inlet channel 535 encloses segment ends 540 and 542. Flexible duct 530 connects to inlet channel 535 and purge gas 580 from a purge gas source (not shown) enters duct 530, passes through inlet channel 535 and flows into spaces 560 and 562 of segments 501 and 502, respectively.

Similarly, inlet channel 536 encloses ends 541 and 543. Flexible duct 531 connects to inlet channel 536 and purge gas 580 from a purge gas source (not shown) enters spaces 560 and 563 via duct 531 and gas inlet channel 536. The outer layer 520 of segment 501 contains perforations 525 throughout which the purge gas in space 560 escapes. The perforations are arranged to establish purge gas flow paths 595 throughout substantially all of space 560.

Segments 501, 502, and 503 contain sides 515, 516, and 517, respectively, and second sides which are opposite to these sides. All of the sides are sealed to prevent the purge gas from flowing through the sides.

Segment 501 has perforations 525 arranged in outer layers 520 so that the flow paths 595 are established throughout substantially all of space 560 for the purge gas entering space 560 through segment ends 540 and 541. The other segments in this embodiment, for example, segment 501, also have perforations in their outer layers so that flow paths are established throughout substantially all of the spaces in all of the segments. If there were additional layers of insulation between the inner and outer layers, then the perforations would extend through all the layers except the inner layer of each segment so that flow paths for the purge gas would be established throughout substantially all of the spaces in the segments. These perforations would be misaligned from one layer to the next to minimize the degradations in performance.

As stated previously, this system offers safe, economical and effective operation on both the ground and in orbit. Unlike most other insulation systems, this invention offers the advantage that the dimensions of the insulation segments do not need to be critical. This insulation system requires less time to construct than do conventional insulation systems which do not have this feature because the measurements for the segments of insulation of this system need not be as accurate as do the measurements of conventional systems.

Figure 6:
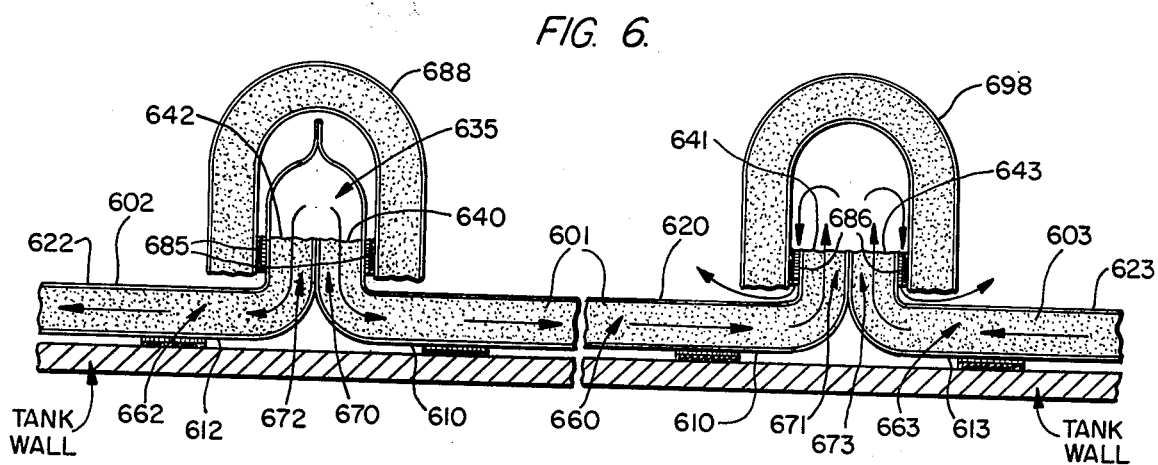
FIG. 6 is a cross section of segments of multi-layer insulation, the ends of the segments being covered by a cap of multi-layer insulation according to the invention.

The thermal efficiency in space of the insulation system of the present invention can be enhanced by covering the ends of the pairs of abutting bent end portions with caps formed from sections of multi-layer insulation. FIG. 6 shows a cross-section of an embodiment of the present invention with multi-layer caps covering the ends.

Segments 601, 602, and 603 have inner layers 601, 612, and 613, respectively, and outer layers 620, 622, and 623, respectively. The inner and outer layers of segments 601, 602, and 603 are separated by spaces 660, 662, and 663, respectively.

Bent end portions 670 and 672 of segments 601 and 602, respectively, abut and the exposed surfaces of ends 640 and 642 are enclosed by gas inlet channel 635. Bent end portions 671 and 673 of segments 601 and 603, respectively, also abut.

Cap 688 is formed from a segment of multi-layer insulation and covers gas inlet channel 635. Cap 688 is connected to outer layer 620 of segment 601 and outer layer 622 of segment 602 by fasteners 685. These fasteners can be of a Velcro material, or of any other material capable of maintaining the connection between the caps and the insulation during the launch, space and reentry environments.

Cap 698 is also formed from a section of multi-layer insulation and it covers the exposed surfaces of ends 641 and 643. Cap 698 is connected to outer layer 620 of segment 601 and outer layer 623 of segment 603 by means of fasteners 686 which are made of the same material as fasteners 685.

Fasteners 686 connect cap 698 to outer layers 620 and 623 such that purge gas can flow out of ends 641 and 643 and past fasteners 686 into the environment surrounding the segments of insulation. In the embodiment illustrated in FIG. 6, fasteners 686 do not extend along the entire width of segments 601 and 603 and the purge gas flows through the gaps in the fasteners. Another way of accomplishing this gas flow is to construct fastener 686 of a gas-permeable material.

It will be apparent to those skilled in the art that modifications and variations can be made in the insulation system of the present invention without departing from the scope or spirit of the invention. It is intended that the present invention cover the modifications and variations provided that they come within the scope of the appended claims and their equivalents.

I claim:

1. An insulation system for a cryogenic vessel comprising:
   a plurality of substantially rectangular, adjacent segments of multi-layer insulation placed on the outer surface of said vessel, said segments comprising a plurality of layers of thin, reflective sheets, separated from each other by spaces through which a purge gas having boiling point below the temperature of said vessel flows, and each of said substantially rectangular segments having two opposing edges referred to as ends, and two other opposing edges referred to as sides, said plurality of segments having
   outwardly bent portions including said ends wherein the end surfaces of said bent portions are exposed, said bent portions of adjacent segments also being adjacent and positioned in an abutting relationship;
   gas inlet channels for introducing said purge gas into said segments, said gas inlet channels enclosing the exposed end surfaces of some of the abutting end portions of each segment such that one of the ends of each of said segments is covered by one of said gas inlet channels, the top of said gas inlet channels being formed from extensions of the outermost layers of said adjacent segments joined together above abutting end portions enclosed by said inlet channels;
   sections of multi-layer insulation forming caps over said abutting end portions including said gas inlet channels, said caps being attached to the outermost layers of said segments and said caps over said end surfaces not enclosed by said gas inlet channels being attached to allow purge gas in said spaces in said segments to escape from said spaces; and
   seals at said sides to prevent the flow of purge gas through said sides.

2. A method of insulating a cryogenic vessel including the steps of:
   placing end-to-end on the outer surface of said vessel a plurality of substantially rectangular segments of multi-layer insulation, said substantially rectangular segments each having two opposing sides and two opposing ends, and also having an inner layer and an outer layer separated by a space through which a purge gas whose boiling point is below the outer temperature of said vessel outer surface flows;
   sealing said sides of said segments of multi-layer insulation to prevent the flow of the purge gas through said sides;
   bending outwardly the portions of said segments including said ends such that the end surfaces are exposed;
   abutting said individual bent end portions of said segments to individual bent portions of end-to-end segments;
   joining the outer layers of adjacent segments of multi-layer insulation above abutting pairs of bent end portions to form gas inlet channels such that one bent end portion of each segment is covered by one of said gas inlet channels;
   covering said abutting bent portions including said gas inlet channels with caps formed from sections of multi-layer insulation;
   attaching said caps to said outer layers of segments such that said purge gas may escape from said spaces through said exposed end surfaces of said abutting bent end portions not covered by said gas inlet channels; and
   flowing said purge gas through substantially all of said space in said segments, said purge gas entering said segments through said gas inlet channels and exiting said segments through said bent end portions not covered by gas inlet channels.

3. An insulation system for a cryogenic vessel comprising:
   a plurality of adjacent segments of multi-layer insulation placed on the outer surface of said vessel, each of said segments having at least a side and at least two ends, and also having at least an inner layer and an outer layer, said inner and outer layers of each of said segments being separated by a space;

gas inlet means for introducing a purge gas having a boiling point below the temperature of said vessel's outer surface into a first number of said ends of said segments, said gas inlet means including outwardly bent portions of said segments at said first number of ends, the surfaces of said first number of ends being exposed and individual bent portions of said segments abutting individual bent portions of adjacent segments to form pairs of abutting bent portions and also including gas inlet channels enclosing said exposed end surfaces of said pairs of said abutting bent end portions; and gas outlet means for establishing continuous flow paths for said purged gas throughout substantially all of said spaces in all of said segments and for allowing the escape of all of said purge gas.

4. The insulation system in claim 3 wherein said outer layers of said adjacent segments of said pairs of abutting bent end portions extend beyond said ends of said adjacent segments and are joined at the top to form said gas inlet channels.

5. The insulation system in claim 3 wherein the outer layers of ones of said adjacent segments of said pairs of abutting bent end portions extend beyond said ends of said ones of said adjacent segments and wrap over said exposed end surfaces and join to the outer layers of the other ones of said adjacent segments to form said gas inlet channels.

6. The insulation system in claim 3, 4, or 5, wherein said segments of multi-layer insulation include layers of thin, reflective sheets.

7. The insulation system in claim 3, 4, or 5 wherein said outlet means includes perforations in said outer layers.

8. The insulation system in claim 7 further comprising sections of multi-layer insulation connected to said outer layers of said segments to form caps over said pairs of abutting bent portions.

9. The insulation system in claim 8 wherein said sides of said segments are sealed to prevent the flow of purge gas through said sides.

10. The insulation system in claim 3, 4, or 5 wherein said outlet means includes outwardly bent portions of said segments of multi-layer insulation at a second number of said ends, the surfaces of said second number of ends being exposed and individual bent portions of said segments at said second number of ends abutting individual bent portions of adjacent segments to form pairs of abutting bent portions.

11. The insulation system in claim 10 further comprising sections of multi-layer insulation connected to said outer layers of said segments to form caps over said pairs of abutting bent portions, said caps over said pairs of abutting end portions of said outlet means allowing said purge gas to escape from said spaces in said segments.

12. The insulation system in claim 11 wherein said sides of said segments are sealed to prevent the flow of purge gas through said sides.

13. A method of insulating a cryogenic vessel including the steps of:

positioning end-to-end on the outer surface of said cryogenic vessel a plurality of adjacent segments of multi-layer insulation having at least a side and at least two ends;

bending outwardly portions of said segments of insulation including the ends of said segments such that such surfaces of said ends are exposed;

abutting said bent end portions of adjacent segments to form pairs of bent end portions;

entering a purge gas whose boiling point is below the temperature of the outer surface of said vessel into the spaces between the inner layers and outer layers of said multi-layer segments at a first number of said ends of said segments; and forcing said purge gas to flow continuously throughout substantially all of said spaces in said segments and out of said spaces.

14. The method of claim 13 further comprising the step of enclosing the end surfaces of a first number of said abutting ends with gas inlet channels.

15. The method of claim 14 wherein said step of enclosing said end surfaces with gas inlet channels includes the steps of:

extending the outer layers of adjacent segments past said first number of ends of said segments; and joining said extending outer layers above said end surfaces to form said gas inlet channels.

16. The method of claim 14 wherein the step of enclosing said end surfaces with gas inlet channels includes the steps of:

extending the outer layers of ones of said adjacent segments at said pairs of bent end portions;

wrapping said extending outer layers above said end surfaces to form said gas inlet channels; and joining said wrapped outer layers to the outer layers of the other at said adjacent segments at said pairs of bent end portions.

17. The method of claim 14, 15, or 16 wherein the step of forcing said purge gas to flow through said spaces includes the step of placing perforations in said outer layers of said segments of multi-layer insulation.

18. The method of claim 14, 15, or 16 wherein the step of forcing said purge gas to flow through said spaces includes the step of allowing said purge gas to escape from said spaces in said segments through the exposed surfaces of a second number of ends, said second number of ends not including any of said first number of ends.

19. The method of claim 17 further comprising the step of sealing the sides of said segments to prevent purge gas from flowing through said sides.

20. The method of claim 18 further comprising the step of sealing said sides of said segments to prevent purge gas from flowing through said sides.

21. The method of claim 19 further comprising the steps of:

forming caps of multi-layer insulation over said pairs of bent end portions; and attaching said caps to said outer layers of said segments.

22. The method of claim 20 further comprising the steps of:

forming caps of multi-layer insulation over said pairs of bent end portions; and attaching said caps to said outer layers of said segments, said caps over said second number of ends also allowing said purge gas to escape from said spaces in said segments.

* * * * *